United States Patent [19]

Hillman

[11] Patent Number: 5,163,534

[45] Date of Patent: Nov. 17, 1992

[54] LUBRICATING APPARATUS

[75] Inventor: Michael J. F. Hillman, London, England

[73] Assignee: British Aerospace plc, London, United Kingdom

[21] Appl. No.: 731,089

[22] Filed: Jul. 17, 1991

Related U.S. Application Data

[63] Continuation-in-part of Ser. No. 665,936, Mar. 5, 1991, abandoned, which is a continuation of Ser. No. 514,222, Apr. 25, 1990, abandoned.

[51] Int. Cl.$^5$ .............................................. F16N 13/10
[52] U.S. Cl. .................. 184/27.1; 184/45.1; 244/213
[58] Field of Search .............. 244/215, 213, 216; 222/41, 260; 184/108, 27.1, 26, 45.1, 105.2, 74

[56] References Cited

U.S. PATENT DOCUMENTS

| | | | |
|---|---|---|---|
| 1,182,777 | 5/1916 | Lavoo | 184/27.1 |
| 1,864,195 | 6/1932 | Hall | 184/27.1 |
| 2,996,149 | 8/1961 | Walker | 184/27.4 |
| 3,124,214 | 3/1964 | Aselman | 184/27.1 |
| 3,347,341 | 10/1967 | Avrea | 184/108 |
| 3,564,944 | 2/1971 | Hill et al. | |
| 3,865,274 | 2/1975 | Genese et al. | 222/41 |
| 4,153,140 | 5/1979 | Mahr et al. | 184/27.1 |
| 4,555,047 | 11/1985 | Ackley | 222/260 |

FOREIGN PATENT DOCUMENTS 0395341 10/1990 European Pat. Off. .

Primary Examiner—Ira S. Lazarus
Assistant Examiner—Alan B. Cariaso
Attorney, Agent, or Firm—Cushman, Darby & Cushman

[57] ABSTRACT

An apparatus for lubricating a slow cycle stroke mechanism, such as that found in a wing flap of an aircraft. The lubricating apparatus moves in conjunction with the wing flap and replenishes lubricant to a ball screw actuator driving the wing flap. The apparatus includes a reservoir and a pumping mechanism for pumping lubricant from the reservoir to the ball screw actuator. A plunger reciprocates within a cylinder to pump lubricant. A compliant element that includes an end stop is positioned to prevent over travel by the plunger and to thereby prevent damage.

4 Claims, 3 Drawing Sheets

LUBRICATING APPARATUS CROSS REFERENCE TO RELATED APPLICATIONS

This application is a continuation in part of application No. 07/665,936, now abandoned, which was a continuation of application No. 07/514,222 now abandoned.

BACKGROUND OF THE INVENTION

1. Field of the Invention

This invention relates to a lubricating apparatus. In particular, this invention relates to a lubricating apparatus that automatically lubricates mechanisms that operate on a slow cycle stroke such as aircraft flaps.

2. Description of the Prior Art

Conventional mechanisms that operate on a slow cycle stroke have a certain lubricant capacity that progressively deteriorates with each cycle of operation. As the lubricant capacity is relatively small, such mechanisms require frequent relubrication to prevent inadequate lubrication and to prevent water and dirt from entering the mechanism, which could thereby cause the mechanism to be damaged. The entry of water into an aircraft flap mechanism carries with it the risk of freezing during normal operation. Maintaining a supply of lubricant is important as it prevents the ingress of water to the mechanism. Frequent relubrication has proven to be disadvantageous in the prior art as it is difficult to control the amount, adequacy or method of relubrication.

Further, with conventional aircraft, the commonplace flying height is from 30,000 to 40,000 feet. At such heights, air associated with moisture expands and could force the lubricant out of the flap mechanism.

Mahr et al. U.S. Pat. No. 4,153,140 discloses a lubrication technique for a rotary shaft positioned within the upper region of a blast furnace. A mechanically actuated pump is mounted with a reduction gear box through which the rotatable shaft is driven. The primary purpose of Mahr is quite different from that of the present invention. Mahr provides a device for lubricating movable members located at hard-to-reach locations. Particularly, Mahr relates to a lubricating apparatus for a drive shaft of a blast furnace. There is absolutely no suggestion that the lubricating apparatus could be redesigned and used in a cyclic manner on a mechanism such as an aircraft flap.

SUMMARY OF THE INVENTION

The present invention is directed at a lubricating apparatus for use with cyclic mechanisms that operate on a slow cycle stroke such as airplane wing flaps. The lubricating apparatus includes a lubricant reservoir, means for pumping a predetermined quantity of lubricant from the reservoir and for supplying the withdrawn quantity of lubricant to the aircraft's flap assembly, and means for controlling the pump's operation in response to operation of the mechanism.

The lubricating apparatus according to the present invention allows the lubricant in the flap to be replenished after the flap has been operated. An amount of lubricant equal at least to that which was dispersed or degraded during operation of the mechanism is supplied to the flap mechanism from the reservoir. In addition to providing continuous lubricant replenishment for lubricating purposes, the present invention has the added feature of preventing or minimizing the ingress of dirt and water into the flap mechanism, and the present invention even has the capability of expelling trapped moisture.

The reservoir of the present invention is provided separate from the flap mechanism. Such a design allows the invention to have a larger lubricant capacity than does the flap mechanism itself. This ensures that lubricant only has to be added to the system on a sporadic basis as the reservoir seldom needs filling. Hence, the maintenance period, that is, the period between fillings, is extended.

Preferably, the pumping means of the present invention includes a reciprocating plunger member disposed within a cylinder having a lubricant inlet and outlet. The plunger is spring-biased into a position so as to allow the ingress of lubricant to the pump from the reservoir. When the plunger is depressed against the spring-bias, the predetermined quantity of lubricant admitted into the pump from the reservoir is expelled through the outlet of the pump. The outlet of the pump is disposed so as yo be connected to the point of the mechanism requiring lubrication. In the preferred embodiment of the present invention, the outlet is connected to the lubrication point of the airplane flap.

The pump is preferably controlled so that with every cycle of the airplane flap mechanism, the plunger is depressed so that the mechanism is supplied with a quantity of lubricant. The plunger is then moved by the spring biasing force into its position that allows the admission of lubricant to the pump so that such lubricant may be supplied to the flap mechanism on its next cycle.

To prevent damage or over pressurization of the lubricant if a blockage should occur, a compliant member may be provided so as to permit a small amount of continued movement of the plunger and/or the cylinder when the flap mechanism is at its limit of movement. This compliant member may be, for example, a spring with a high stiffness disposed between the end of the plunger and the structural member. The compliant member may also be a flexural mounting of either the structural member or the lubricating apparatus itself.

The amount of lubricant delivered by each operation of the pump is controlled by the stroke of the plunger member and the dimensions thereof. Thus the stroke and/or the dimensions must be set so as to provide a desired quantity of lubricant. Adjustment of the amount of lubricant supplied is performed using an adjustment element. The adjustment element is provided at the end of the plunger member or assumes the form of a stop attached to the structure.

The lubricant is fed into the pump at a slight pressure. The reservoir is also provided with a spring biased piston that acts to supply the lubricant at the slight pressure. It is also preferable to include some type of indication means on the reservoir that provides information regarding the amount of lubricant left therein.

Further, between the pump and the outlet, a non-return valve is provided. This valve prevents any undesired backflow of the lubricant to the pump. Another such valve is also disposed so as to prevent flow from the pump to the reservoir.

The lubricant used in the present invention that provides lubrication of an airplane flap is preferably either oil or grease.

BRIEF DESCRIPTION OF THE DRAWING

Other objects, features and characteristics of the present invention, as well as the methods of operation and the combination of parts will become apparent upon consideration of the following detailed description of the and the appended claims with reference to the drawings, wherein like elements are designated by corresponding reference numbers and wherein:

DETAILED DESCRIPTION OF THE PRESENTLY PREFERRED EXEMPLARY EMBODIMENT

Figure 1:
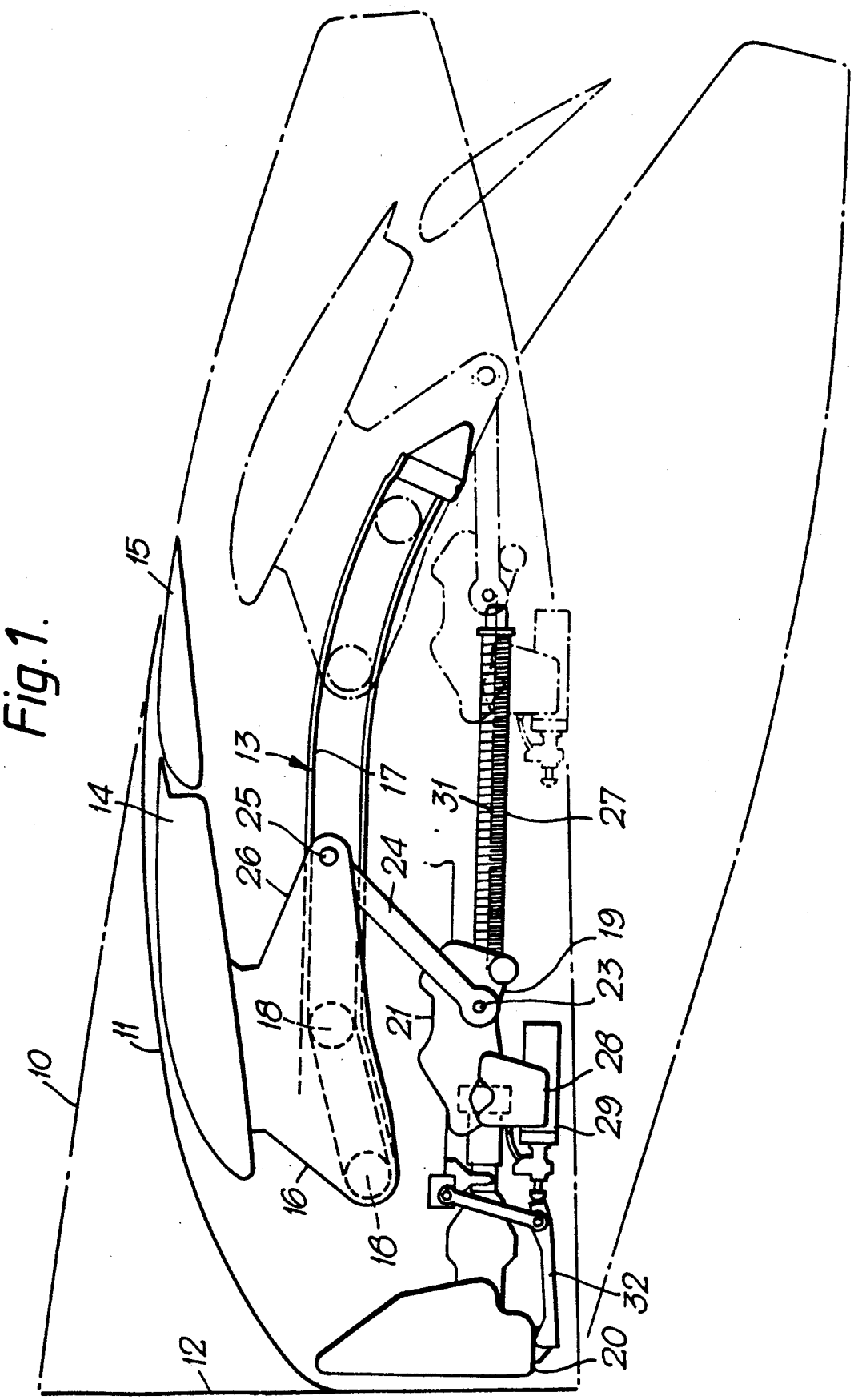
FIG. 1 depicts a side elevational view of a wing trailing edge flap system.

FIG. 1 depicts a trailing edge portion 10 of an aircraft wing that includes trailing edge shroud 11 extending rearwardly of rear spar 12. Flap support track 13 is mounted within trailing edge portion 10 by mounting means (not shown). Support track 13 supports a double slotted trailing edge flap assembly including main flap portion 14 and auxiliary flap portion 15. Flap support is provided by mounting bracket 16 depending from the undersurface of main flap portion 14 and engaging trackway 17 in flap support track 13 by way of rollers 18. Support track 13 is shaped in a semiarcuate form so as to control the attitude of the flap as it translates rearwardly from its stowed to its fully deployed position.

The flap assembly is driven by linear ball screw actuator 19 that extends rearwardly from rear spar 12. Actuator 19 is pivotally attached to a mounting bracket joined to the rearward face of spar 12.

Figure 2:
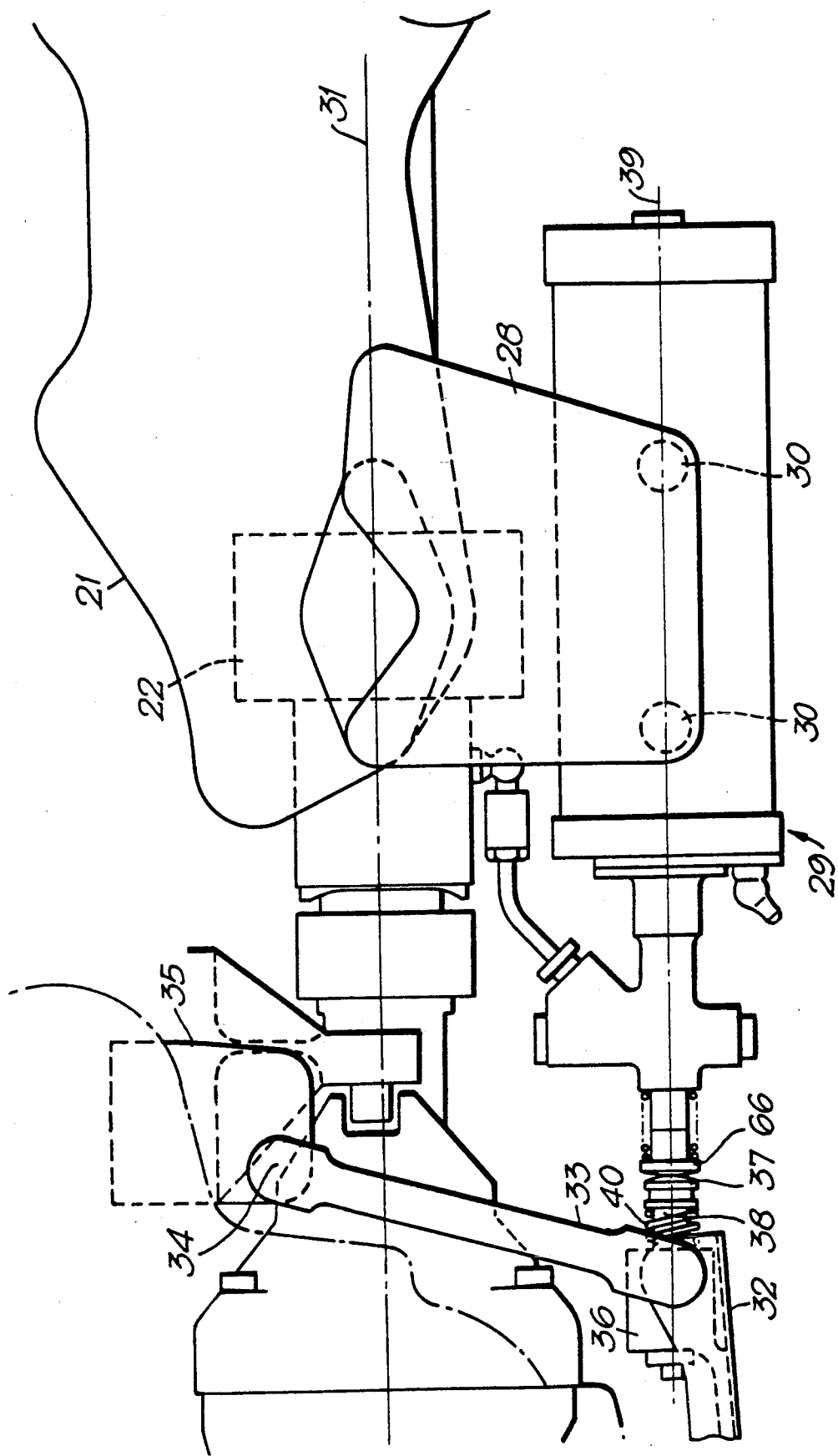
FIG. 2 shows a portion of the ball screw jack assembly incorporating the lubricating apparatus, FIG. 2 being an enlargement of the of part of FIG. 1.

As is illustrated in FIGS. 1 and 2, ball screw actuator 19 includes side plates 21 that are located on and move with ball screw trunnion 22. Pivotal attachment 23 connects a flap drive link 24 (FIG. 1) to side plate 21. The upper end of flap drive link 24 is pivotally attached to rearward extension 26 of mounting bracket 16 by attachment 25. Rotation of shaft 27 of ball screw actuator 19 provides linear displacement of trunnion 22, thereby driving the flap rearwardly.

Also attached to side plates 21 are lubricator mounting plates 28, to which lubricator assembly 29 is located via attachments 30 (FIG. 2). Lubricator assembly 29 is mounted substantially parallel to ball screw actuator longitudinal axis 31.

Fixedly located to rear spar attachment bracket 20 is a rearwardly extending compliance mounting bracket. The rearward extending compliance mounting bracket is supported off its rearward extremity by strut 33 that is attached to bracket 35 at its upper end via upper attachment 34. Bracket 35 is disposed upon the ballscrew jack body. Compliant assembly 36 includes spring-loaded dome-headed plunger 37 mounted upon strut 32. Compliant assembly 36 has a line of action 38 corresponding substantially to lubricator longitudinal axis 39.

Figure 3:
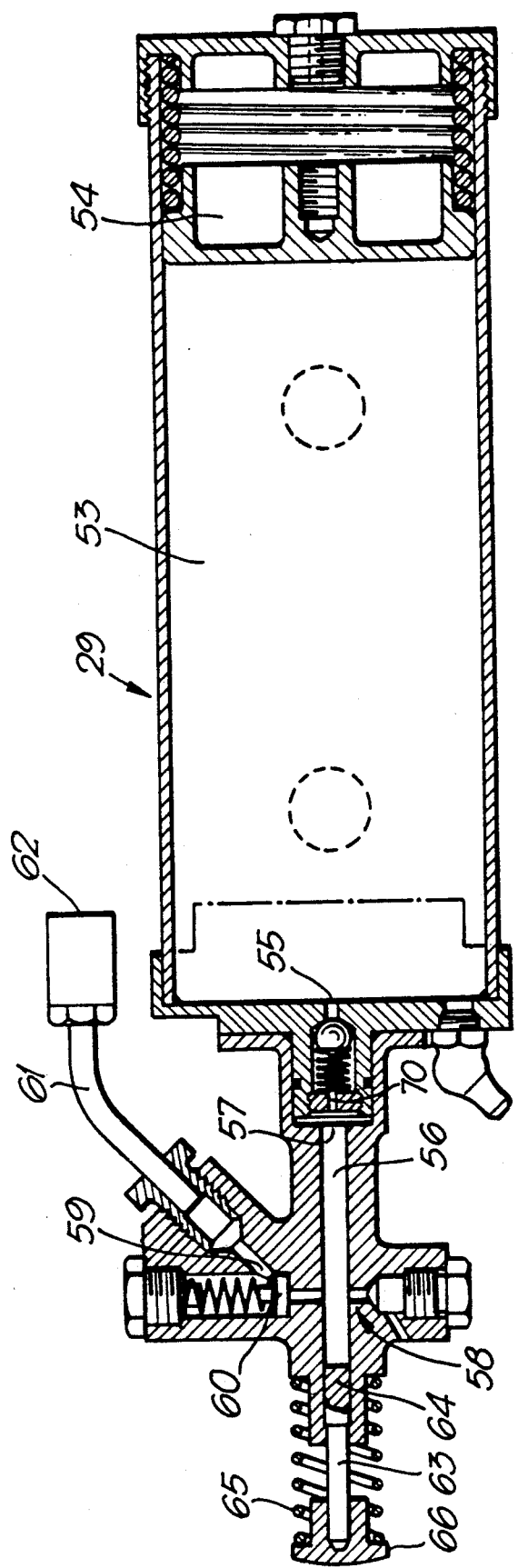
FIG. 3 illustrates a longitudinal cross section of the lubricating apparatus of the present invention.

FIG. 3 is a view of lubricator assembly 29 that is attached to ball screw jack 19. Ball screw jack 19 has a grease capacity of about 50 cc. Lubricant in ball screw jack 19 must be replenished after about 250 flight cycles. If the aircraft flap undergoes two flap operations per flight, then about 0.1 cc of grease is used with every flap operation. An aircraft usually performs about 3500 flights annually, thereby requiring relubrication of the ball screw jack on about a monthly basis. To overcome this problem, lubricating apparatus 29 is attached to ball screw jack 19 to cyclically lubricate jack 19.

Lubricating apparatus 29 is capable of providing 0.1 cc of grease to the ball screw jack for every operation thereof. Apparatus 29 includes a reservoir 53 that contains the grease. The grease is maintained at a slight pressure by spring biased piston 54.

Reservoir outlet 55 leads via line 56 and non-return valve 70 to inlet 57 of pump 58. Pump 58 acts as a miniature grease pump. Pump outlet 59 leads via non-return valve 60 and line 61 to the grease point 62 of ball screw jack 19.

The pump functions by reciprocal movement of plunger 63 within cylinder 64. Plunger 63 is biased by spring 65, which acts between one end of the cylinder and flange 66 on plunger 63. When plunger 63 is biased by spring 65, a quantity of grease is admitted through inlet 57. When plunger 63 is depressed against the spring biasing force, the lubricant is expelled through outlet 59 and non-return valve 60 through line 61 to jack 19.

The pump is structured so as to supply lubricant to jack 19 once per cycle of operation of jack 19. Accordingly, lubricating apparatus 29 is mounted via lubricator mounting plates 28 (FIG. 2). As the pump moves from right to left in FIG. 1, the end of plunger 63 contacts dome-headed plunger 37 (FIG. 2). As jack 19 continues moving to the left in FIG. 1, plunger 63 is forced to move relative to the cylinder, in effect depressing the plunger. When jack 19 moves to the right in FIG. 1, spring 65 urges the plunger out of the cylinder to admit lubricant and the cycle begins anew.

It is preferable to provide a compliant component element between the plunger and the stop to prevent damage of over-pressurization of the lubricant if a blockage should occur. If the compliant element was not provided and a jam occurred, cylinder 64, plunger 63, and other pieces of the lubricating apparatus could break or be damaged.

The compliant assembly includes dome-headed plunger 37 that acts as an end stop. Preferably, dome-headed plunger 37 is biased by stiff spring 40 or some type of flexure between the lubricating apparatus or plunger 37. The stiffness of spring 40 must be such that sufficient pressure is generated to force lubricant through outlet 59.

The quantity of the lubricant delivered by the pump each time the plunger is depressed depends upon the dimensions of plunger 63 and the plunger stroke. Such variables must be selected to accommodate the particular apparatus to which lubricating apparatus 29 is attached. To deliver 0.1 cc of lubricant to ball screw jack 19 for moving an airplane wing flap, plunger 63 needs a diameter of about 3.5 mm operating with a stroke of about 10 mm. It is possible to make fine adjustments to the amount of lubricant delivered by the pump by adjusting an element on the end of the plunger (not shown) or included as an integral part 38 (FIG. 2) of compliant assembly 36.

The size of reservoir 53 is limited only by space and weight considerations. In the embodiment pictured in FIGS. 1 and 2, a 700 cc reservoir should provide ample lubricant for 3500 flights annually. However, when a plurality of such systems are provided for multiple flaps on an aircraft, the weight combined of the systems may be too much for the wing and/or the aircraft to carry. In such cases, a 350 cc reservoir provides good lubrication to ball screw jack 19, and the supply will last for about six months. Of course, in other applications the size of reservoir 53 may vary.

It is preferable to provide some type of external indicating means in combination with piston 54. Such a structure allows a person, such as a mechanic servicing an airplane, to determine the amount of lubricant remaining in reservoir 53 so that such may be changed when necessary.

It is to be understood that the present invention has been described in relation with what is presently considered to be the preferred embodiment of the invention. However, the invention is not limited to the described embodiment, but rather is meant to encompass those alternative embodiments included within the spirit and scope of the claims.

I claim:

1. A lubricating apparatus in combination with a mechanism for moving a wing flap of an aircraft, comprising:
   means for moving said wing flap;
   lubricating means, attached to said moving means, for lubricating said moving means, said lubricating means including:
   means for storing lubricant until its use is required;
   means for withdrawing the lubricant from the storing means and pumping means for pumping the lubricant to said mechanism; and
   means for preventing damage to the pumping means during any jam or blockage of the lubricating means and for controlling the operation of said pumping means in response to operation of said mechanism.

2. A lubricating apparatus in combination with a mechanism for moving a wing flap of an aircraft according to claim 1, wherein said moving means comprises:
   a ball screw actuator having a ball screw shaft that undergoes rotational movement;
   means for driving said wing flap; and
   means for converting rotation of said ball screw shaft into linear displacement of said driving means.

3. A lubricating apparatus in combination with a mechanism for moving a wing flap of an aircraft according to claim 1, wherein said driving means and said converting means comprise:
   an arcuate flap support track along which said wing flap is movable; and
   a flap drive link for connecting said wing flap to said ball screw actuator.

4. A method for supplying a lubricant from a lubrication assembly to a driving mechanism for a wing flap of an aircraft, said method comprising the steps of:
   pumping a lubricant from a reservoir to a pumping mechanism by a first longitudinal movement of a plunger within a cylinder, said movement being caused by a biasing force of a spring acting on said plunger;
   moving said wing flap to an extended position simultaneous to said pumping step;
   moving said wing flap to a retracted position and simultaneously therewith, expelling said lubricant from said pumping mechanism to said driving mechanism by a second longitudinal movement of said plunger in said cylinder; and
   preventing damage to said lubricating assembly by positioning a compliant stop along the path followed by said plunger, thereby preventing over travel.

* * * * *